Sept. 27, 1960　　　A. J. SLEMMONS　　　2,953,940
TRANSMISSION SHIFT CONTROL DEVICE
Filed April 9, 1953　　　　　　　　　　4 Sheets-Sheet 1

Fig. 1

INVENTOR.
Arthur J. Slemmons.
BY
Harness and Harris
ATTORNEYS.

United States Patent Office 2,953,940
Patented Sept. 27, 1960

2,953,940

TRANSMISSION SHIFT CONTROL DEVICE

Arthur John Slemmons, Birmingham, Mich., assignor to Chrysler Corporation, Highland Park, Mich., a corporation of Delaware Filed Apr. 9, 1953, Ser. No. 347,796

17 Claims. (Cl. 74—645)

This invention is related to automatic transmissions of the type which are suitable for use with automotive vehicles. More particularly, this invention comprises a mechanism for controlling the planetary reduction gear elements of an automatic vehicle transmission used to deliver power from a vaned fluid driven member or other power slip means to the vehicle driving wheels. The slip means may, for example, be the turbine or rotor member of a hydraulic torque converter or fluid coupling, the turbine member of a gas turbine power-plant, an electromagnetic clutch, an eddy current clutch, a magnetic fluid clutch, a friction slip clutch, or any other suitable torque delivering device.

It has been the general practice to provide automatic transmissions having clutch or brake controlled planetary elements with fluid pressure responsive actuators for energizing the clutches or brakes. The controls for the fluid pressure actuators normally comprise slidable valve elements suitably disposed within a valve housing and arranged to control the distribution of fluid pressure from an engine driven pump through fluid conduit means to cause the clutches or brakes to become energized in a proper sequence of operation, said valve elements being operative in response to movement of a suitable governor device. When such a transmission is used in conjunction with a power slip means, the problem of vehicle "creep" is necessarily presented when the power-plant is idling or when the power-plant output speed is increased during those instances when it is desirable to maintain the vehicle in a stationary position.

Various attempts have been made in the past to eliminate this undesirable "creep" by providing various types of braking devices which are independent of the planetary transmission itself and which are controlled by either a separate valve body or by means of a separate mechanical actuator.

The complexity of such devices and the additional cost and space required for an additional braking mechanism has in some cases prohibited the use of an "anti-creep" device entirely. In such cases where no attempt to overcome vehicle "creep" is made, the driver of the vehicle is compelled to employ the vehicle wheel brakes to maintain the vehicle stationary.

The present invention provides a novel solution to this problem by providing a means, which is inherent in the transmission itself, for preventing undesirable "creep" regardless of the speed of the power-plant output shaft. This means comprises a valve arrangement which serves the dual purpose of controlling the fluid pressure from a conventional engine driven control pump to energize the clutches and brakes of the transmission planetary elements for normal operation and also of controlling the operation of these same clutches and brakes so that they function to eliminate vehicle creep.

The planetary elements of the transmission are operative to selectively produce either a forward or reverse operation upon being energized by their respective fluid pressure responsive actuators. When the forward planetary actuator is energized preparatory to forward operation of the vehicle, the valve arrangement of the present invention is effective to energize the reverse planetary actuator with a reduced fluid pressure during those instances when "anti-creep" braking is desired, thereby providing a reverse torque in the planetary system of a sufficient magnitude to overcome the forward torque being delivered through the forward planetary element by the vehicle engine. This braking pressure may then be relieved by the operator of the vehicle by means of a novel throttle linkage arrangement which is effective to open a port in the control valve body when the engine throttle valve is opened, said port being effective to exhaust the reduced pressure within the reverse planetary actuator.

The throttle linkage is also effective to be used at the discretion of the operator to control the engine throttle independently of the control valve body. This feature makes it possible to increase the power-plant speed while the vehicle is in a stationary position without relieving the "anti-creep" braking pressure. Although the forward torque tending to cause the vehicle to "creep" increases at higher engine speeds, the valve arrangement of the present invention is effective to correspondingly increase the anti-creep braking action by suitably regulating the fluid pressure within the reverse planetary actuator.

When the vehicle is in motion, the valve arrangement is effective to utilize the output pressure of a vehicle speed responsive pump to maintain the exhaust port for the reverse planetary actuator fluid continuously open and to thereby prevent the initiation of "anti-creep" braking if the engine throttle should be accidentally moved to the closed position.

The valve arrangement also includes a manual selector valve to selectively direct fluid pressure to either the forward or reverse planetary actuators. "Anti-creep" braking for reverse gear is obtained by energizing the forward planetary actuator with a reduced pressure thereby overcoming the reverse torque being delivered through the forward planetary element. A fluid actuated locking detent is adapted to engage and lock the selector valve to prevent the operator from shifting from forward to reverse at vehicle speeds above a predetermined value. The vehicle speed responsive pump pressure which is utilized to maintain the planetary actuator exhaust port open while the vehicle is moving, is also conducted to the locking detent to actuate the same.

The provision of a transmission control means of the type briefly outlined above being a principal object of the invention, another object of the invention is to eliminate vehicle "creep" at any power plant speed with a minimum of expense and space being required.

A further object of the invention is to provide a means responsive to engine speed for increasing the "anti-creep" braking action as the power-plant output torque increases.

A further object of the invention is to provide a valve means for controlling the planetary clutch and brake fluid actuating pressure which is responsive to throttle movement.

A further object is to provide a throttle linkage arrangement which will permit the operator to increase the power-plant speed to a point at which the output torque is high, without interrupting or overcoming the anti-creep braking action, thereby making possible a high acceleration start when the anti-creep braking action is released.

A further object is to provide a sliding valve arrangement to permit the operator to selectively energize the transmission brake and clutch actuating device which includes a means for preventing a selection of valve positions at vehicle speeds which are not within a predetermined range.

For the purpose of clearly and concisely pointing out the features and mode of operation of this invention, reference will be made in the following description to one embodiment which is illustrated in the accompanying drawings wherein.

Figure 1:
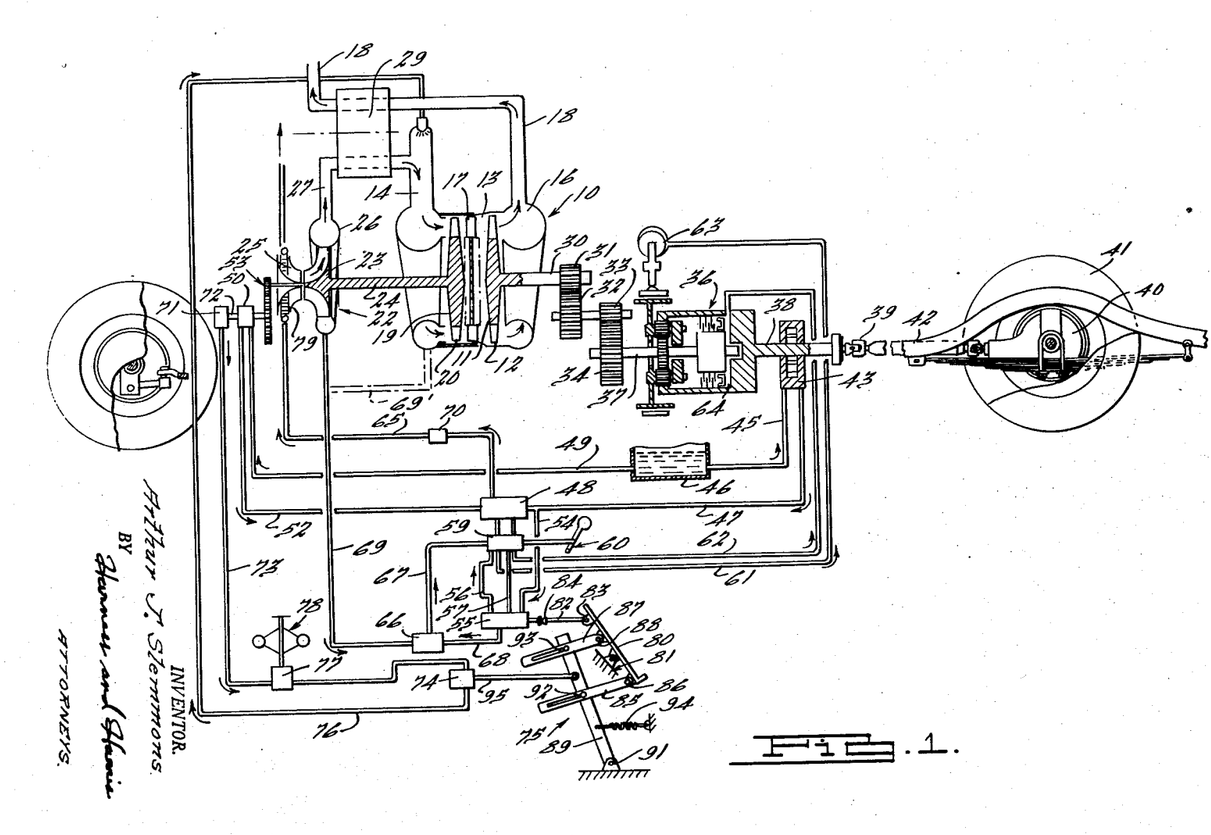
Figure 1 is a schematic representation of a vehicle having a gas turbine power-plant and a transmission with controls.

Referring more particularly to Figure 1, the numeral 10 designates generally a gas turbine power-plant which includes a rotatably mounted turbine member 11 having peripherally mounted thereon blades 12 which are transversely situated within an annular gas conduit 13 interposed between a burner 14 and an exhaust chamber 16. Fixedly mounted within conduit 13 is an annular series of guide vanes 17 which is adapted to change the direction of gas flow at the turbine inlet so as to increase the efficiency of the unit. The turbine exhaust gases are conducted to the vehicle exhaust stack through a conduit 18.

Included within the gas turbine unit is a compressor drive member 19 mounted in juxtaposition with respect to turbine member 11 and in axial spaced relation thereto. Member 19 also carries peripherally mounted blades 20 which extend transversely within the gas conduit 13 connecting the burner 14 and exhaust chamber 16.

A centrifugal compressor unit, designated generally by the numeral 22 and axially spaced with respect to members 11 and 19, comprises a rotor 23 which is driven by a compressor drive shaft 24 connected to the compressor drive member 19. The compressor further includes an air intake element 25 which directs ambient air into the intake portion of rotor 23. Surrounding the air outlet portion of rotor 23 is a circular high pressure housing 26 from which a conduit 27 extends. Conduit 27 in turn leads to the gas turbine combustion chamber or burner 14.

The turbine member 11 is fixed to a turbine shaft 30 which extends axially with respect to turbine member 11 and member 19 and has a common axis with shaft 24. Mounted on one end of turbine shaft 30 is a pinion 31 which forms a part of a reduction gear train which also includes gears 32, 33 and 34.

The numeral 36 designates generally a simple planetary gear arrangement which includes a power input shaft 37 drivably connected at one end to gear 34 of the reduction gear train. The planetary unit 36 has a power output shaft 38 which is connected at the outer end to a drive shaft yoke 39. The yoke 39 is drivably connected to the vehicle rear differential gear 40 and wheels 41 by means of drive shaft 42. The reduction gears 31, 32, 33 and 34, together with planetary unit 36, are included within a common transmission housing and will subsequently be more fully described with reference to Figures 2a and 2b.

A turbine oil pump is shown at 43 and is drivably connected to output shaft 38. An oil conduit 45 interconnects oil pump 43 and the oil sump 46 and is effective to conduct oil from the sump to the low pressure inlet of the pump 43. A conduit 47 is connected to the high pressure side of oil pump 43 and extends to one side of the main pressure regulator valve 48.

Another conduit 49 interconnects oil sump 46 with the low pressure side of another oil pump shown at 50 which will be referred to as the compressor oil pump. Conduit 52 is connected to the high pressure outlet of the compressor oil pump 50 and extends to the other side of the main pressure regulator valve 48. The rotor of the pump 50 is driven by the compressor rotor 23 through a suitable gear reduction assembly shown generally at 53.

A conduit 54 branches off from the conduit 47 and is connected at the other end to an anti-creep dump valve 55. A manual shift valve shown at 59 is manually actuated by means of the linkage designated generally at 60 and is interconnected with the anti-creep dump valve 55 by two conduits 56 and 57. Conduits 61 and 62 also are connected to the manual shift valve 59 and extend to the planetary reverse band servo 63 and the planetary forward disc clutch servo 64, respectively.

An anti-creep pressure regulator valve is shown at 66 and is interconnected with the manual shift valve 59 and dump valve 55 by fluid conduits 67 and 68, respectively. A high pressure air line 69 interconnects the high pressure housing 26 of the compressor 22 and the valve 66 whereby regulator valve actuating air pressure is tapped from the compressor to regulate the operation of the valve 66. As an alternative construction, the high pressure side of the gas turbine may be tapped to obtain a high pressure source as indicated by dotted lines at 69'.

The fuel system for the gas turbine unit comprises a fuel pump 71 driven by a drive shaft 72 which is secured to the rotor of the compressor oil pump 50. The pump 50 is in turn driven by the compressor through the reduction gears 53, as previously pointed out. A fuel line 73 leads from fuel pump 71 to throttle valve 74 which is actuated by the throttle linkage designated generally at 75. Another fuel line 76 interconnects the throttle valve 74 with the burner 14 of the gas turbine.

The lubrication system for the transmission includes a lubrication oil line 65 leading from the main pressure regulator valve 48 to an oil cooler 79 which is adapted to be exposed to the cool inlet air at the compressor intake. After passing through the oil cooler, the oil is fed to the lubrication system proper. A lubrication pressure regulator valve 70 is located in line 65.

Located in line 73 is a suitable governor shut-off valve 77 which is adapted to control the rate of fuel consumption in response to compressor speed by means of a suitable centrifugal governor designated generally at 78. Any suitable governor drive between the compressor and the governor proper may be used.

The throttle linkage 75 includes a foot pedal 80 which may be pivoted at an intermediate point, as at 81, to a suitable fixed mounting such as the "floor board" of the vehicle. A link 82 is pivoted to one end of the foot pedal at 83 and carries an abutment member 84 at the other end for contacting a slidable valve element in the anti-creep dump valve 55. Another link 85 is pivoted at the other end of pedal 80 at 86 and a third link 87 is pivoted at 88 to the pedal at a point intermediate the pivots 83 and 81. Another link 89 is pivoted to a fixed part of the vehicle at 91 and is connected to both links 85 and 87 by means of lost motion pin and slot connections 92 and 93 respectively. A spring 94 is suitably adapted to bias the link 89 in an upward direction as shown in Figure 1. A rod 95 interconnects throttle valve 74 and link 89.

It should be observed that the overall organization of the power-plant, transmission and transmission controls is illustrated schematically in Figure 1 merely for convenience. The position of the various elements of the organization with respect to each other as they actually would appear in a scaled drawing do not necessarily bear a relationship to that which is shown in Figure 1.

Figure 2A:
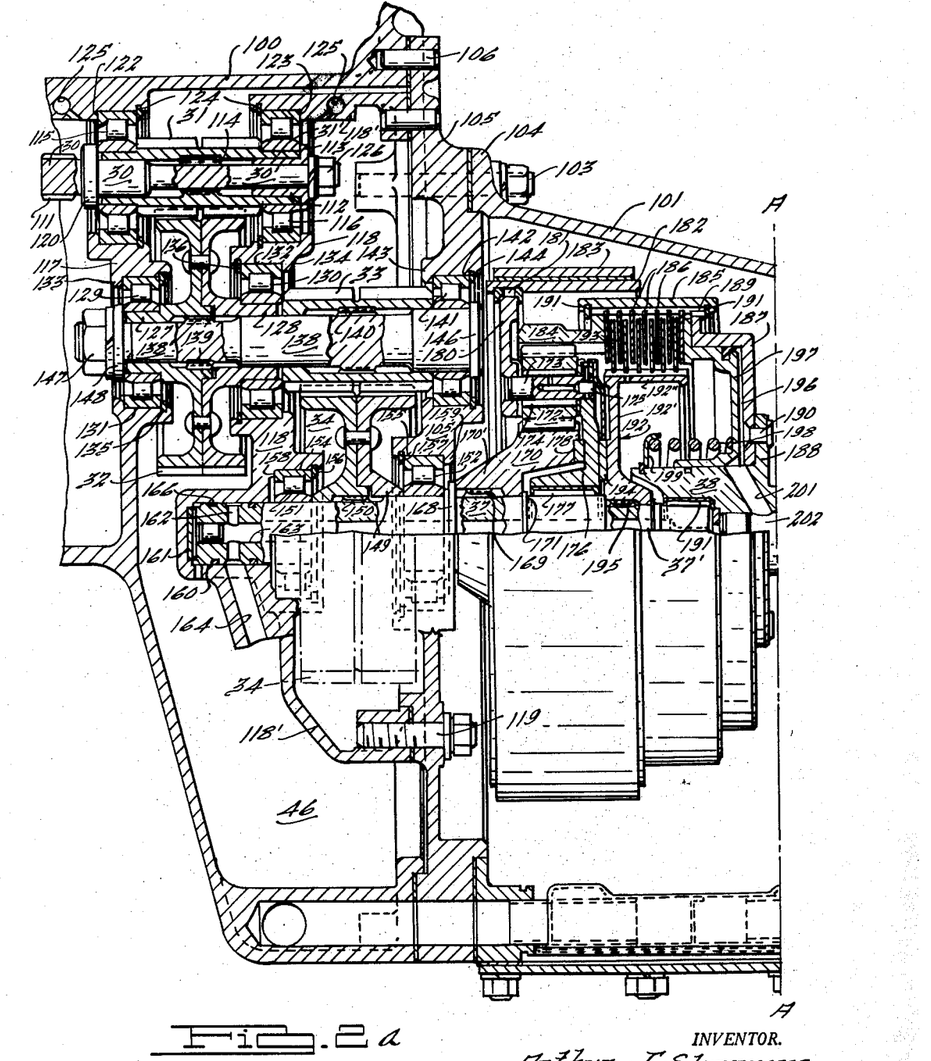
Figure 2a is a cross sectional assembly view of a portion of the transmission illustrated schematically in Figure 1.
Figure 2B:
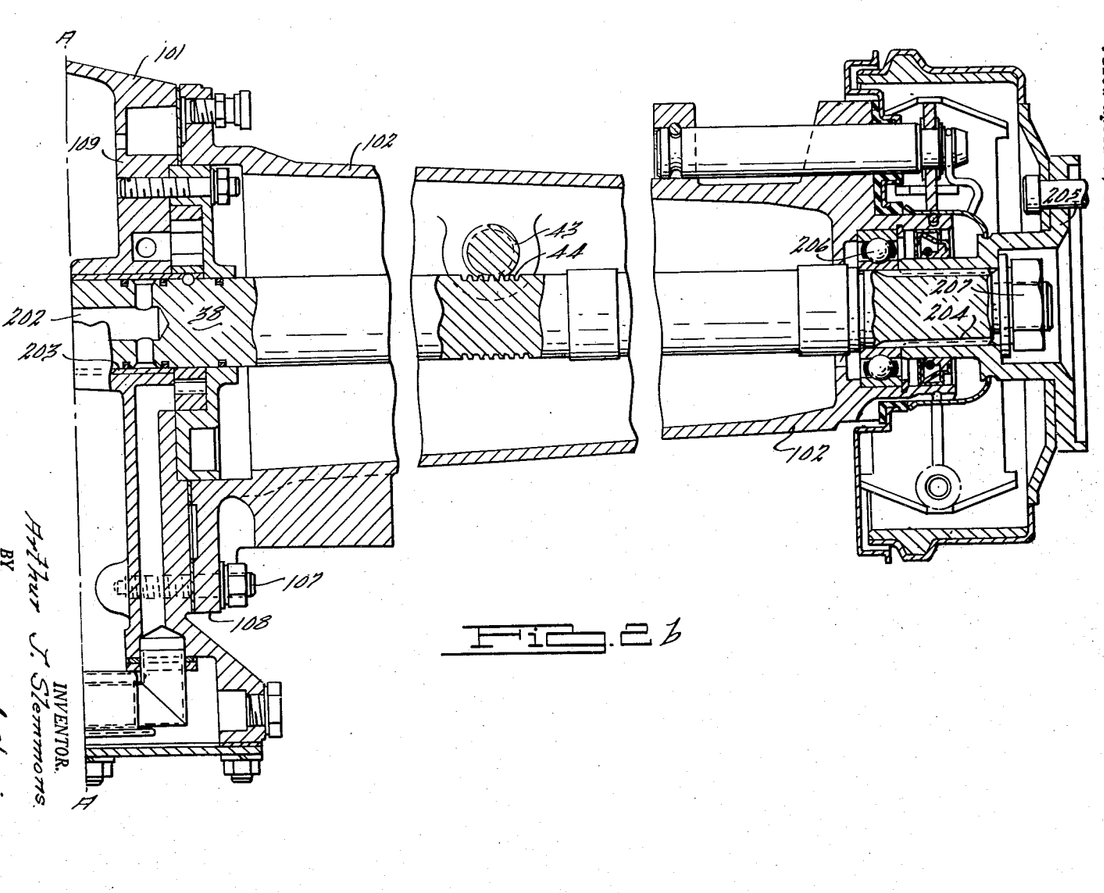
Figure 2b is a continuation of Figure 2a and separated therefrom at line A—A and showing the output portion of the assembly.

Referring to Figures 2a and 2b, the transmission which includes reduction gears 31, 32, 33, and 34 and planetary 36, and which was previously referred to in a general manner with reference to Figure 1, will be described in more particular detail at this point.

The transmission proper is enclosed within a suitable housing which consists of three principal portions 100, 101 and 102. The forward end of portion 100, which is not completely shown in the drawings, may be suitably attached to the power-plant housing or the frame of the vehicle. Portion 100 and intermediate portion 101 are suitably joined by means of studs 103 extending through a peripheral flange 104 on housing portion 101, the studs being secured to a support plate 105 bolted to the portion 100. Dowel pins 106 serve to position the support plate 105 with respect to housing portion 100. The portion 102 is joined to the other end of intermediate housing portion 101 by means of studs 107 extending through a radial flange 108 on the portion 102, the studs being secured to a support plate 109 directed inwardly from the portion 101.

The turbine shaft 30 includes at least two portions which may be integrally joined by means of a spline connection, as at 111 in Figure 2a. One portion of shaft 30 extends into the transmission housing and is disposed within an axial bore through the hub 31' of pinion 31. The shaft 30 has an end portion 30' of reduced diameter which extends through a sleeve 112 inserted within the axial bore of hub 31'. The sleeve 112 has a radial flange 113 which overlaps the end of the hub 31'. Relative rotation between shaft 30 and pinion 31' is prevented by means of a splined driving engagement, shown at 114, between internal spline teeth formed in the hub bore and mating external spline teeth are formed on the reduced portion 30' of shaft 30.

The hub of the pinion 31 is rotatably mounted in bearings 115 and 116 located at either end of the hub. Bearings 115 and 116 are in turn seated within suitable recesses in a plate 117 and a support member 118, respectively. Plate 117 is integrally cast to the housing portion 100 and support member 118 is securely mounted on support plate 105 by means of studs 119 which threadably engage an axially extending ring portion 118' of the member 118. The housing 100 and the support plate ring portion 118' may each be provided with suitable oil jets, as at 125, for cooling the bearings 115 and 116, respectively. Oil under pressure may be supplied to the jets 125 in any well known manner. Axial movement of bearings 115 and 116 is prevented by the annular shoulders 122 and 123 of the plate 117 and support member 118 respectively located around the bearing recesses. Snap rings 124 are suitably adapted to retain the bearings flush against their respective shoulders. A radial flange 120 on shaft 30 is adapted to overlap and contact bearing 115. The end of the reduced diameter portion 30' is threaded to receive a nut 126. When the nut is tightened, the flanges 120 and 113 engage the adjacent bearings and the assembly consisting of shaft 30, portion 30', sleeve 112 and bearings 115 and 116 are held in a fixed axial position with respect to the transmission housing.

Gear 32, the second gear of the reduction gear train, meshes with the pinion 31 and it includes a hub having portions 127 and 128 extending in either axial direction. Hub portions 127 and 128 are rotatably mounted in bearings 129 and 130, respectively. Plate 117 contains an axial recess 131 which is adapted to receive bearing 129, and support member 118 contains a recess 132 which is similarly adapted to receive bearing 130. Annular shoulders 133 and 134 and snap rings 135 and 136 are adapted to retain the bearings 129 and 130 in a fixed axial position. A shaft 138 extends axially through a bore within the hub of gear 32 and is formed at one end with a reduced portion 138' upon which are formed external spline teeth shown at 139. The teeth 139 mesh with internal spline teeth formed within the bore of the hub of gear 32 to produce a driving engagement.

The shaft 138 also extends through an axial bore in the hub of pinion 33 and has formed thereon external spline teeth designated at 140 which drivably engage internal spline teeth formed within the axial bore of the gear hub. The end of shaft 138 opposite to the reduced portion 138' is rotatably mounted in a bearing 141 which is received within an axially extending recess 142 in support plate 105. The bearing 141 is axially fixed by an annular shoulder 143 and snap ring 144. A radial flange 146 is formed on the end of shaft 138 and overlaps and contacts the bearing 141. The end of the reduced diameter portion 138* is threaded to receive a nut 147 which, when tightened, will cause the washer 148 to engage bearing 129 and to axially fix the position of gear 32 and pinion 33 with respect to the housing. The width of the hub of pinion 33 is such that it is axially positioned between the inner races of bearings 130 and 141. It is thus apparent that gear 32, pinion 33 and shaft 138 turn as a unit.

Gear 34 meshes with pinion 33 and it includes a hub 149 having an axial bore through which shaft 37 extends. The axial bore through hub 149 is formed with internal spline teeth shown at 150 which drivably engage external spline teeth formed on the shaft 37. The shaft 37 is rotatably mounted in bearings 151 and 152 located on either side of gear 34 which are received within an axial recess 154 in support member 118 and an axial recess in plate 105, respectively. The bearings 151 and 152 are fixed in an axial position by snap rings 156 and 157 and by annular shoulders 158 and 159, respectively. The shaft 37 has an extension beyond bearing 151 which is inserted in a recess 160 within the member 118. A thrust washer 161 is placed between the bottom of the recess and the end of the extrusion of shaft 37. Radially extending apertures 162 are provided on the extension of shaft 37 which communicate with an axially extending bore 163 through the center of shaft 37. The outer ends of aperture 162 communicate with a passage 164 which leads to the oil sump or reservoir 46. Suitable packing rings 166 are located at either side of apertures 162 on the exterior of shaft 37. A radial shoulder 168 on the shaft 37 contacts the side of the inner race of bearing 152. The width of the hub of gear 34 is such that it assumes a fixed axial position between bearings 151 and 152.

External spline teeth 169 are formed on the shaft 37 on the right side of shoulder 168 opposite the bearing 152. A sun gear 170 having an axially bored hub is mounted concentrically about shaft 37 and has an offset hub portion 170' with internal spline teeth formed therein which mesh with the external spline teeth on shaft 37 to form a driving engagement. The offset portion 170' of the sun gear hub is held in abutting engagement with the shoulder 168 by a snap ring 171 on the opposite side of the offset portion.

The sun gear 170 meshes with planet gears 172, each of which includes an axially bored hub through which a pin 173 extends. Each planet gear 172 is rotatably mounted on the associated pin 173 by means of needle bearings 174 which are provided with a suitable means for providing lubrication such as oil passages 175. One end of each pin 173 is secured to carrier member 176 which is concentrically mounted about shaft 37 and which is allowed to float thereon by means of needle bearings 177. A thrust spacer member 178 is inserted between the hub of sun gear 170 and the carrier member 176. The other end of pin 173 is secured to carrier member 180 which is in the form of an annular plate having external spline teeth formed on its outer periphery at 181. A brake drum 182 has formed thereon internal spline teeth which are adapted to mesh with the external spline teeth on member 180 to form a unitary sub-assembly. A brake band shown at 183 having a suitable internal friction surface surrounds the brake drum and is adapted to either hold or release the brake drum as will be subsequently explained. Any suitable number of such planet gears may be provided about the sun gear 170.

A ring gear 184 surrounds the planet gears and is adapted to mesh therewith, the outer periphery of the ring gear 184 being in splined engagement with a circular clutch member 185. The clutch member 185 is internally splined and is adapted to receive and to retain therein a plurality of externally splined clutch plates 186, the splined portions of the member 185 and the plates 186 being in meshed engagement. Another clutch element 187, having external spline teeth on its outer periphery which engage the internal spline teeth of member 185, as shown at 189, is secured to a radial flange 188 on output shaft 38 by a suitable fastening means such as rivets 190. Snap rings 191 are provided on either end of the splined member 185 to prevent relative axial movement of the ring gear 184, clutch plates 186 and clutch element 187. It is thus seen that shaft 38, members 187 and 185, clutch plates 186 and ring gear 184 constitute a unitary structure.

Another clutch element shown at 192 comprises a radial portion 192' and an axially extending annular portion 192'', the latter portion being externally splined as shown. Clutch plates 193, having internal spline teeth which engage the splined portion 192'', are carried by clutch element 192. A spacer ring 194 may be interposed between carrier member 176 and clutch element 192. The shaft 37 has an externally splined end portion 37' which is received by element 192 in a central bore having internal splines forming a driving engagement at 195 with the external splines on portion 37'. The portion 37' is also received in an axial bore in the end of shaft 38 and is rotatably mounted therein by means of needle bearings 191.

The clutch element 187 forms with shaft 38 an annular cavity 196 within which a piston element 197 is fitted. The piston element 197 is biased in one axial direction by a spring 198 which is seated at one end thereof upon a spring seat 199. The cavity 196 is in communication with oil passage 201 which extends through shaft 38 to a central bore 202.

The shaft 38 extends through a sleeve bearing 203 fixed within support plate 109 and through the end housing portion 102. The end of shaft 38 is externally splined as shown at 204. An output flange 205 has an internally splined central bore in driving engagement with the splined end of shaft 38 and is rotatably supported by bearing 206 which is seated in the end of housing portion 102. A nut 207 is used to retain the output flange 205 and shaft 38 in a fixed axial position with respect to the transmission housing.

Figure 3:
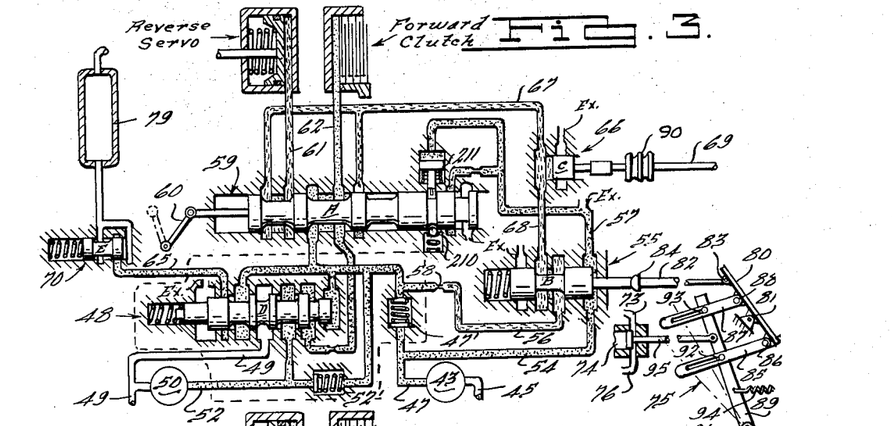
Figure 3 is a partly schematic control valve diagram showing the position of the valves during forward operation.
Figure 4:
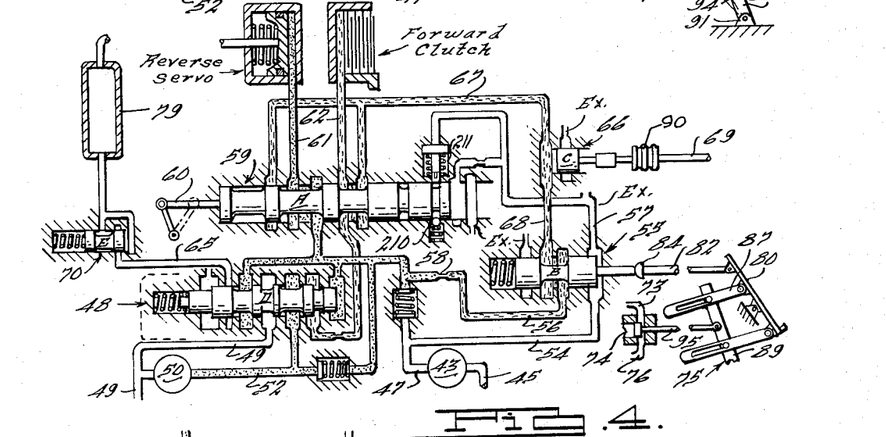
Figure 4 is a view of the control valves of Figure 3 showing the valve positions for reverse operations.
Figure 5:
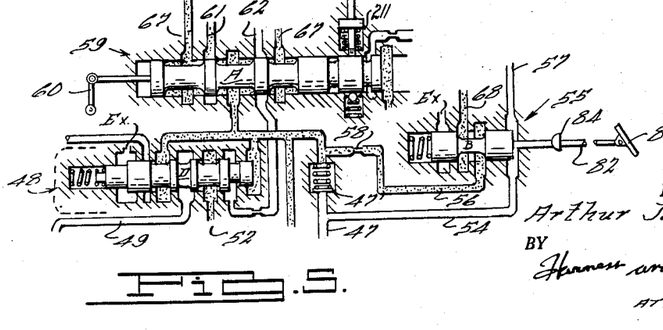
Figure 5 is a view of the control valves of Figure 3 showing the valve positions for the neutral or transitory stage.

Referring to Figures 3, 4, and 5, the valve assembly for the transmission controls may be observed in more particular detail. The valve assembly proper includes five principal valve components, namely, the manual selector valve 59, the anti-creep dump valve 55, the anti-creep pressure regulator valve 66, the main pressure regulator valve 48 and the lubricant pressure regulator valve 70, all of which have been referred to previously with reference to Figure 1. The movable valve elements for each of the above five principal components will be given the letter designations A, B, C, D, and E, respectively.

The reverse servo is shown schematically in the drawings and is used to actuate a conventional brake band mechanism, not shown. The brake band mechanism in turn energizes the transmission brake band 183. A spring loaded ball detent as shown at 210, is used to engage a peripheral groove in element A to maintain a predetermined axial position of the element A with respect to the valve housing. A fluid actuated detent is shown at 211 which has a lower stem adapted to engage the bottom of the peripheral groove in element A. This lower stem is preferably adapted to permit a slight axial movement of element A when the detent 211 is in the operative position. The valve assembly includes several oil exhaust ports which permit the oil to dump from the valve chambers into the oil sump, each of these ports being designated by the symbol "Ex".

A further detailed description of the valve construction is not deemed necessary since this will be apparent from the following description of the valve operation.

The operation of this invention is as follows:

Having reference first to Figure 1, it will be assumed that the vehicle transmission is in the neutral or intermediate range and that the vehicle is not moving. The gas turbine power-plant 10 is merely idling at this point, no power being delivered to the wheels. The position of the valve elements in the valve body is as illustrated in Figure 5.

In the disclosed embodiment, the foot pedal 80 is passed by the operator so that it is caused to pivot about point 81. The forward motion of the pedal is transmitted to link 89 through the link 87. The motion of link 89 is in turn transmitted to throttle valve 74 through rod 95. Valve 74 regulates the rate of fuel flow from fuel pump 71 through line 76 which in turn supplies the burner 14 of the gas turbine power-plant. The burned gases pass through annular chamber 13 and drive turbine member 11 and compressor drive member 19 and are then exhausted out the conduit 18 after passing through the regenerator 29. The compressor drive member 19 is effective to drive the compressor rotor 23 which in turn feeds intake air through conduit 27 to the burner 14 after first passing through the rotary regenerator 29 where it is preheated, the exhaust gases being effective to heat the regenerator tubes. The compressor oil pump 50 increases the oil pressure in line 52 which is transmitted to the valve members 48, 55 and 59 as shown by the shaded conduits in Figure 5. The oil pressure at one end of valve element D acts against the spring pressure exerted at the other end thereof. The valve element D is effective to supply fluid to line 65 and to line 49 when the end spring pressure thereon is overcome. The fluid thus dumped into line 49 is then conducted back to the oil sump. The oil in line 65 is delivered to the lubrication system through regulator valve 70. When the lubricant pressure falls to a low value, the element E is shifted to the right under end spring pressure thereby opening a communication between cooler 79 and line 65. The valve 70 is effective to maintain the lubrication pressure at a value of approximately 60 p.s.i. The valve 70 as shown in Figures 3 and 4 is in the shut off position.

It may be observed in Figure 5 that fluid ports in valve member 59 opening into conduits 61 and 62, which lead to the reverse brake servo and forward clutch in the transmission respectively, are blocked off by element A. Therefore, since neither ring gear 184 nor the planet carrier member 180 is held, the planet gears 172 merely idle about the sun gear 170 as the sun gear 170 is caused to rotate under the influence of the turbine idling torque being delivered from turbine shaft 30 to shaft 37 through the reduction gear train 31, 32, 33, and 34.

The valve elements assume the positions shown in Figure 3 when forward drive is desired. The lever 60 may be actuated to shift the manual selector valve element A to the right and to uncover the port in valve member 59 leading to line 62. The high pressure oil, which is represented by the dotted shading, is therefore allowed to energize the forward clutch in the transmission by moving the piston element 197 to the left, as viewed in Figure 2a to compress the clutch plates 186 and 193.

The main pressure regulator valve 48 is effective to maintain a maximum working pressure of 90 p.s.i. The element D for the valve 48 shifts to the left when the pressure builds up at the discharge side of pump 50 and at the right end of element D exceeds the maximum value thereby allowing excess pump discharge to dump into line 49 and back to the oil sump. The high pressure discharge from the compressor pump 50 is allowed to pass through the one-way valve 52' but is not allowed to pass through the one-way valve 47' into line 54.

A constricting orifice is located in line 56, as shown at 58, and a certain percentage of the discharge from pump 50 passes through orifice 58 into line 56 which leads to dump valve 55. The fluid undergoes a considerable pressure drop while passing through orifice 58 and the fluid under this reduced pressure is designated by elongated shading marks. The dump valve 55 allows the low pressure fluid to pass through line 68, through line 67 and then through the selector valve 59 to line 61.

The anti-creep pressure regulator 66 s in communication with line 68 and is effective to prevent an excessive pressure build-up. When fluid in line 68 increases beyond a predetermined maximum value, the element C uncovers the exhaust port to dump the fluid from line 68 into the sump. A bellows 90 actuated by the air within line 69, which is bled from the compressor, is effective to bias the element C against the fluid pressure within line 68. Thus it is apparent that when the selector valve 59 is shifted to the forward drive position while the vehicle still remains stationary, the reverse servo will engage the reverse brake with a slight anti-creep braking pressure to compensate for the tendency of the forward clutch to engage and to drivably connect or lock up shafts 37 and 38 in the transmission.

When the operator steps on the foot throttle 80 to start the vehicle moving, the rod 82 moves the element B of the dump valve 55 to the left against end spring pressure thus permitting the reverse servo braking pressure to dump out of the dump valve exhaust port. The forward clutch in the meantime becomes fully engaged due to the increase in the discharge pressure from pump 50.

As soon as the vehicle begins to move, the rear turbine pump 43 begins to increase the pressure in lines 54 and 57. This pressure is allowed to pass from line 54 through the anti-creep pressure regulator valve 55 to line 57 where it is exhausted through the exhaust port in line 57 to the sump. The pressure in line 57 is sufficiently high after the vehicle begins to gain speed to cause detent 211 to engage the annular groove in element A of the manual selector valve 59. If the operator should attempt to shift the selector valve 59 to the reverse position, then the element A will shift to the left by virtue of the lost motion permitted between the stem of detent 211 and the annular groove of elemnet A. This lost motion is sufficient to cause the exhaust port in the end of selector valve to be uncovered thereby immediately causing the pressure in line 57 to drop to a lower value which in turn causes the detent 211 to disengage element A. Since the detent is thereby disengaged, there is no restraint offered to the movement of element A to the left.

The detent 211 is effective, however, to prevent a shift into reverse when the vehicle is traveling at speeds above a predetermined safe value such as, for example, 30 m.p.h. The detent spring is calibrated so that when an attempt is made to shift element A to the left when the vehicle is traveling faster than 30 m.p.h., the pressure within line 57 is still sufficient to maintain the detent stem engaged within the associated annular groove in element A. The pressure drop caused by the unseating of the exhaust port for valve 59 is not sufficiently great at such a vehicle speed to permit the detent spring to move the detent stem out of the annular groove. This locking feature serves both as a safety device and as a means for preventing excessive wear on the clutch and brake friction surfaces.

The ball detent 210 merely serves to position the element A and does not offer an appreciable resistance to the axial movement of element A.

Since it is undesirable to allow the anti-creep braking pressure to energize the reverse servo every time the operator relieves his foot from the throttle pedal, the anti-creep dump valve is designed to remain in the left position until the vehicle reaches a low road speed such as, for example, 3 m.p.h. At any greater speed the pressure from rear pump 43 is sufficient to hold element B against the end spring pressure in the exhaust position regardless of the position of the foot throttle. Since the element B is thereby kept in the left-hand exhaust position, the braking pressure in line 56 is blocked off from the reverse servo.

If the operator of the vehicle should desire to increase the power-plant r.p.m. to a high value before starting in order to obtain a fast acceleration or "jack rabbit" take-off, the throttle pedal 80 is depressed with the heel instead of the toe of the operator's foot. This will cause the pedal 80 to pivot clockwise about pivot 81 and move link 85 axially which in turn rocks link 89 about pivot 91. The movement of link 89 is transmitted to the throttle valve 74 by rod 95. It should be noted that element B of the dump valve 55 is not moved by rod 82 in this instance. When the power-plant r.p.m. is increased, the air pressure in line 69, which is bled from the compressor 22, is correspondingly increased. This causes a greater pressure to be exerted upon element C of the anti-creep pressure regulator 66 and consequently, the anti-creep braking pressure in line 68, line 67 and the reverse servo is allowed to increase.

It is thus seen that the anti-creep braking pressure is proportional to power-plant speed which in turn is proportional to output torque.

The mode of operation of the valve assembly during reverse operation may best be observed in Figure 4. The manual selector valve element A is moved to the left. The compressor pump 50 will increase the pressure in line 52 and this pressure is then transferred to the reverse servo through the uncovered ports in valve 59 leading to the reverse servo. This high pressure fluid is illustrated in the drawing by dotted shading.

When the reverse servo is actuated, the brake band 183 is effective to hold the planet carrier member in the transmission in a stationary position. The power being delivered from shaft 37 to 38 must therefore pass through the planetary and since the shaft 38 is part of the planetary ring gear assembly, its direction of rotation will be opposite to that of shaft 37.

Since the shaft 38 is now rotating in the reverse direction, rear pump 43 does not create a pressure in line 54 and consequently, the self-locking feature of the anti-creep dump valve 55 and the locking action of detent 211 are absent during reverse operation. The constricting orifice 58 is effective to provide a reduced anti-creep pressure which is permitted to pass through dump valve 55 and the manual valve 59 into the forward servo to counteract the creeping tendency of the reverse mechanism. The anti-creep pressure regulator 66 is effective, as previously explained to regulate the anti-creep pressure to a low value which is proportional to the magnitude of the power-plant output torque.

Because of the fact that the anti-creep dump valve is not held in the exhaust position at speeds above 3 m.p.h., as in the case of forward drive, the anti-creep pressure will energize the forward clutch during high speed reverse operation when the foot pedal is released. However, this feature is not considered to be a material disadvantage since the duration of the operation in reverse is short in comparison to the duration of forward operation. Consequently, premature forward clutch failure from excessive slip is not a likely possibility.

The present invention functions to provide an increased factor of safety in the operation of automotive vehicles in that the attention of the operator is not required to initiate an "anti-creep" braking action. Also, the "anti-creep" pressure may be dissipated or dumped into the oil sump in response to either car speed or accelerator pedal movement.

It should be observed that the present invention is capable of being used in installations having any other form of power-plant such as, for example, an internal combustion engine. The "anti-creep" pressure regulator valve 66 may be connected in such installations to the intake manifold to obtain valve actuating pressure.

It should also be observed that the present invention may be readily adapted to be used on other forms of planetary transmissions. This could be done by supplying "anti-creep" pressure to one of the forward clutches or brakes for reverse operation and to a reverse clutch or brake for forward operation. It makes little difference if the particular planetary element involved is controlled by a disc brake or clutch or a band-type brake or clutch since the appropriate modifications required in either instance to operatively associate the control device of the present invention with the planetary gear assembly would be obvious to a skilled artisan.

If a particular installation makes use of a fluid coupling or torque converter, the "anti-creep" pressure regulator valve may be made responsive to the hydraulic fluid pressure from an impeller driven pump. In general, any other engine speed responsive means may be used to actuate the "anti-creep" pressure regulator such as engine water pump pressure, engine-powered oil pump pressure, a mechanical or electrical governor, generator voltage or, as previously pointed out, intake manifold pressure.

Although only one embodiment of the invention has been disclosed, modifications thereof may readily become apparent to persons skilled in the art within the scope of the invention as defined in the following claims.

What I claim is:

1. A transmission shift control device for use with a planetary gear reduction unit, two hydraulic mechanisms for controlling said reduction unit to selectively provide either of two power flow paths therethrough respectively, and a fluid pressure source for supplying each of said hydraulic mechanisms with actuating fluid pressure; said control device comprising a valve body, a manually actuated selector valve disposed within said valve body and including a slidable valve element adapted to be fixed in one of two axial positions, said slidable valve element carrying axially spaced lands in sliding contact with said valve body and forming with said valve body three peripheral cavities, a first fluid conduit extending from said pressure source to said selector valve, a second and third fluid conduit extending from said selector valve to each of the two said hydraulic mechanisms respectively, another fluid conduit extending from said pressure source to said selector valve and communicating therewith at a location axially spaced from said second and third conduits, a fluid constricting means located in said other conduit for reducing the fluid pressure therein, a pressure regulator valve means disposed in said valve body and located in said other conduit, said pressure regulator valve means being responsive to fluid pressure from an external source for regulating the reduced fluid pressure to a value proportional to the magnitude of the pressure from said external source, a first of said selector valve peripheral cavities being effective to selectively and alternately interconnect said first conduit to said second conduit and said third conduit, a second of said selector valve peripheral cavities being effective to interconnect said second conduit and said other conduit upon movement of said slidable valve element to one of said axial positions, and a third of said selector valve peripheral cavities being effective to interconnect said other conduit with said third conduit upon movement of said slidable valve element to the other of said axial positions, one of said hydraulic mechanisms being subjected to full actuating pressure while the other of said hydraulic mechanisms is subjected to said regulated reduced fluid pressure.

2. In a transmission shift control for use with wheeled vehicles having a power-plant with a foot throttle linkage controlled fuel system, a planetary transmission adapted to transmit the power-plant output torque to the vehicle wheels, two hydraulic mechanisms for controlling said planetary transmission to selectively obtain either forward or reverse operation, a first fluid pressure source for energizing said hydraulic mechanisms and a second fluid pressure source adapted to be powered by the transmission output torque; the improvements comprising a valve body housing, an anti-creep dump valve means disposed within said housing, one fluid conduit means extending from said first fluid pressure source through said dump valve means to one of said hydraulic mechanisms, another fluid conduit means extending from said second fluid pressure source to said dump valve means, an exhaust port in said dump valve means, said dump valve means being adapted to be axially positioned by said throttle linkage to provide communication between said one conduit means and said exhaust port when said dump valve means has assumed one axial position, a fluid pressure reducing constriction located in said one conduit means, and a pressure regulator means disposed within said valve body housing in communication with said one conduit means for regulating the reduced pressure in said one conduit means to a uniform value, said pressure regulator means including a cylindrical bore in said valve body housing communicating at one end thereof with said one conduit means, an exhaust port in communication with said bore, a piston valve element slidably disposed within said bore and adapted to cover said exhaust port, a fluid pressure source adapted to be energized by said power plant, a fluid pressure line extending from said pressure source to said valve body adjacent said pressure regulator means, and a fluid pressure responsive means for moving said valve element including a portion connected to said fluid pressure line, said piston valve element being adapted to variably restrict said fluid pressure line whereby the fluid actuating pressure within said one hydraulic mechanism is regulated to a value which is proportional to the pressure in said fluid pressure line.

3. In a transmission shift control for use with wheeled vehicles having a power-plant with a foot throttle linkage controlled fuel system, a planetary transmission adapted to transmit the power-plant output torque to the vehicle wheels, two hydraulic mechanisms for controlling said planetary transmission to selectively obtain forward and reverse operation, a first fluid pressure source for energizing said hydraulic mechanisms, and a second fluid pressure source adapted to be powered by the transmission output torque for supplying fluid pressure which varies with said torque; the improvements comprising a valve body housing, an anti-creep dump valve means disposed within said housing, one fluid conduit means extending from said first fluid pressure source through said dump valve means to one of said hydraulic mechanisms, another fluid conduit means extending from said second fluid pressure source to an exhaust port in said dump valve means, said dump valve means being adapted to be axially positioned by said throttle linkage to provide communication between said one conduit means and said exhaust port when said dump valve means has assumed one axial position, a second fluid conduit means extending from said second pressure source to said dump valve means effective to shift the latter to provide communication between said one conduit means and said exhaust port at a predetermined transmission output speed, a fluid pressure reducing constriction located in said one conduit means, and a pressure regulator means disposed within said valve body housing in communication with said one conduit means for regulating the reduced pressure in said one conduit means to a uniform value, said pressure regulator means including a cylindrical bore in said valve body housing communicating at one end thereof with said one conduit means, an exhaust port intersecting said bore and in communication therewith, a piston valve element slidably disposed within said bore and adapted to cover said exhaust port, a power-plant torque responsive means for moving said valve element axially whereby the fluid actuating pressure within said one hydraulic mechanism is regulated to a value which is proportional to the power-plant torque.

4. In a transmission shift control for use with a wheeled vehicle having a power-plant with a foot throttle linkage controlled fuel system, a power-plant speed responsive fluid pressure source energized by said power-plant, a planetary transmission adapted to transmit the power-plant output torque to vehicle wheels, two hydraulic mechanisms for controlling said planetary transmission to selectively obtain either forward or reverse operation, a first fluid pressure source for energizing said hydraulic mechanisms and a second fluid pressure source adapted to be powered by the transmission output torque; the improvements comprising a valve body housing, a selector valve means slidably disposed within said valve body housing and adapted to assume either of two axial positions, pressure responsive detent means for retaining said selector valve means in one of said axial positions, a slidable anti-creep dump valve means for exhausting the fluid from one of said hydraulic mechanisms, one fluid conduit means extending from said first fluid pressure source through said dump valve means and said selector valve means to said one hydraulic mechanism, another fluid conduit means extending from said second fluid pressure source through said dump valve means to said detent means, said other conduit means being adapted to apply a fluid pressure force to said dump valve means to maintain said dump valve means in a fluid exhaust position and to actuate said detent means.

5. In a transmission shift control for use with a wheeled vehicle having a power-plant with a foot throttle linkage controlled fuel system, a power-plant speed responsive fluid pressure source energized by said power-plant, a planetary transmission adapted to transmit the power-plant output torque to the vehicle wheels, two hydraulic mechanisms for controlling said planetary transmission to selectively obtain either forward or reverse operation, a first fluid pressure source for energizing said hydraulic mechanisms, and a second fluid pressure source adapted to be powered by the transmission output torque; the improvements comprising a valve body housing, a selector valve means slidably disposed within said valve body housing and adapted to assume either of two axial positions, pressure responsive detent means for retaining said selector valve means in one of said axial positions, a slidable anti-creep dump valve means for exhausting the fluid from one of said hydraulic mechanisms, one fluid conduit means extending from said first fluid pressure source through said dump valve means and said selector valve means to said one hydraulic mechanism, another fluid conduit means extending from said second fluid pressure source through said dump valve means to said detent means, said other conduit means being adapted to apply a fluid pressure force to said dump valve means to maintain said dump valve means in a fluid exhaust position and to actuate said detent means, said selector valve means comprising a slidable valve element having a peripheral groove thereon, and said detent means comprising a bore within said valve body housing intersecting the said selector valve means and having an axis substantially perpendicular to the axis of said valve element, a piston element slidably disposed within said bore, a stem portion carried by said piston element on one side thereof and adapted to engage said valve element within said peripheral groove, spring means surrounding said stem for biasing said piston element and stem away from said valve element, and means for providing fluid communication between the portion of the bore on the other side of said piston and said other conduit means whereby the selector valve means becomes locked in one of said axial positions when said second fluid pressure source creates sufficient pressure to move said piston element against said spring means.

6. In combination with a transmission shift control for use with vehicles having a power plant with a throttle valve controlled fuel system and a transmission adapted to transmit power-plant output torque, said transmission including two fluid pressure responsive actuating means for selectively obtaining a forward and reverse output torque respectively, and a fluid pressure source for simultaneously supplying each of said actuating means with actuating pressure; a valve means for exhausting working fluid from one of said actuating means, another valve means for regulating the actuating pressure for said one actuating means to a value which is proportional to power plant torque, a throttle linkage means for actuating said first-named valve means, said throttle linkage means comprising a foot pedal having toe and heel portions thereon and having a pivotal mounting means intermediate said portions, a rod pivoted at one end thereof to said toe portion and adapted to contact said first-named valve means to actuate the same, a first link pivoted to said pedal intermediate said mounting means and said rod, a second link pivoted to said heel portion, a third link having a pivotal mounting at one end thereof and being connected to said first and second link by means of lost motion connections, and a second rod pivoted at one end to said third link and adapted to actuate the throttle valve at the other end thereof whereby both the throttle valve and said first-named valve means may be actuated simultaneously upon movement of the said pedal in one angular direction, and whereby only said throttle valve may be actuated upon movement of the said pedal in the other angular direction.

7. In combination with a transmission shift control for use on vehicles having a gas turbine engine with an intake air compressor drivably powered thereby, a throttle valve controlled fuel system, a planetary transmission, fluid pressure responsive actuating means for controlling said transmission and a fluid pressure source for supplying said actuating means with actuating pressure; a valve means for exhausting working fluid from said actuating means, another valve means for regulating the said actuating pressure to a value which is proportional to power-plant speed, and a throttle linkage means for actuating said first-named valve means, said other valve means including a pressure conduit in communication with said compressor, said pressure conduit being adapted to tap compressed air from said compressor to actuate said other valve means.

8. In a power transmission for use with an engine powered vehicle, said vehicle including an engine and an engine fuel supply system for providing a regulated fuel supply for said engine, a fluid driven member, a power output member, a first geared power flow path adapted to be activated to drivably connect said fluid driven member and said output member to provide for the delivery of a driving torque to said output member tending to drive the latter in one direction, a second geared power flow path adapted to be activated to drivably connect said fluid driven member and said output member to provide for the delivery of a driving torque to said output member tending to drive the latter in the opposite direction, a first and a second fluid pressure responsive actuator means for selectively activating said first and said second power flow path respectively, a fluid pressure source, a first and a second conduit interconnecting each of said actuator means and said fluid pressure source, said conduits being adapted to accommodate the delivery of fluid pressure simultaneously to each of said actuator means to energize the same, means in said second conduit for providing a reduced pressure therein with respect to the pressure existing simultaneously in said first conduit, a valve means having portions disposed in each of said first and second conduits for selectively connecting one of said actuator means with said second conduit while simultaneously connecting the other of said actuator means with said first conduit, said valve means being further adapted to selectively and alternately connect said one actuator means with said first conduit while simultaneously connecting the said other actuator means with said second conduit, and means for regulating the magnitude of said reduced pressure to a value which is proportional to the magnitude of the torque being delivered through said one geared power flow path.

9. In a power transmission for use with a self-propelled vehicle, a fluid driven member, a power output member, a first geared power flow path adapted to be activated to drivably connect said fluid driven member and said output member to provide for the delivery of a driving torque to said output member tending to drive the latter in one direction, a second geared power flow path adapted to be activated to drivably connect said fluid driven member and said output member to provide for the delivery of a driving torque to said output member tending to drive the latter in the opposite direction, a first and a second fluid pressure responsive control means for selectively activating said first and said second power flow path respectively, a fluid pressure source, a first conduit interconnecting said fluid pressure source and said first actuator means, a second conduit interconnecting said fluid pressure source and said second control means, said conduits being adapted to accommodate the delivery of fluid pressure simultaneously to each of said control means to energize the same, and means in said second conduit for regulating the magnitude of the pressure energizing said second control means to a value which is proportional to the magnitude of the torque being delivered through said one geared power flow path.

10. In a power transmission for use with a self-propelled vehicle, a fluid driven member, a power output member, a first geared path adapted to be activated to drivably connect said fluid driven member and said output member to provide for the delivery of a driving torque to said output member tending to drive the latter in one direction, a second geared path adapted to be activated to drivably connect said fluid driven member and said output member to provide for the delivery of a driving torque to said output member tending to drive the latter in the opposite direction, a first and a second fluid pressure responsive control means for selectively activating said first and said second path respectively, a fluid pressure source, a first conduit interconnecting said fluid pressure source and said first control means, a second conduit interconnecting said pressure source and second control means, said conduits being adapted to accommodate the delivery of fluid pressure to each of said control means simultaneously to energize the same, a fixed fluid flow restriction in one of said conduits effecting a pressure drop thereacross at a location upstream of one of said control means, and means for regulating the magnitude of the pressure downstream of said location to a value which is proportional to the magnitude of the torque being delivered through said one geared power flow path.

11. In a self-propelled vehicle having a powerplant, an engine fuel control means including a valve element operatively associated with said powerplant and adapted to control the rate at which fuel is applied thereto, a power output member, a first geared path adapted to be activated to drivably connect said powerplant and said output member to provide for the delivery of a driving torque to said output member tending to drive the latter in one direction, a second geared path adapted to be activated to drivably connect said powerplant and said driven member to provide for the delivery of a driving torque to said output member tending to drive the latter in the opposite direction, a first and a second fluid pressure responsive actuator means for selectively activating said first and said second path respectively, a fluid pressure source, a first conduit interconnecting said fluid pressure source and said first actuator means, a second conduit interconnecting said fluid pressure source and second actuator means, said conduits being adapted to accommodate the delivery of fluid pressure to each of said actuator means simultaneously to energize the same, means in one of said conduits for maintaining the pressure energizing one of said actuator means at a reduced value with respect to the pressure simultaneously energizing the other of said actuator means, a valve means having portions in said one conduit for exhausting the reduced pressure from said one actuator means, said valve means being adapted to be actuated by said fuel flow control means upon operation of the latter, and means for regulating the magnitude of said reduced pressure to a value which is proportional to the magnitude of the torque being delivered through said one geared power flow path.

12. In a self-propelled vehicle, a source of motive power, a power output member, a power slip means having relatively movable portions, one of said movable portions being powered by said source of motive power, a first geared power flow path adapted to be activated to drivably connect the other of said movable portions and said output member, said first power flow path being further adapted to deliver a driving torque to said output member to drive the latter in one direction, a second geared power flow path adapted to be activated to drivably connect said other portion and said output member, said second power flow path being further adapted to deliver a driving torque to said output member to drive the latter in the opposite direction, a first and a second fluid pressure responsive control means for activating said first and said second power flow paths respectively, and means for energizing one of said control means with actuating fluid pressure to cause torque to be delivered through one of said power paths while simultaneously energizing the other of said control means with a controlled fluid pressure to cause torque to be delivered through the other of said power flow paths, the torque being delivered through said one power flow path opposing the torque being delivered through said other power flow path, the energizing means further including valve means for regulating said controlled fluid pressure to a value which is proportional to the magnitude of the torque delivered through said power slip means.

13. The combination as set forth in claim 12 and comprising in addition a fuel control device for said source of motive power, second valve means operable conjointly with said fuel control device for deenergizing said other control means, and means for operating said fuel control device independently of said second valve means.

14. In a power transmission for use with a self-propelled vehicle, a fluid driven member, a power output member, a first geared path adapted to be activated to drivably connect said fluid driven member and said output member to provide for the delivery of a driving torque to said output member tending to drive the latter in one direction, a second geared path adapted to be activated to drivably connect said fluid driven member and said output member to provide for the delivery of a driving torque to said output member tending to drive the latter in the opposite direction, a first and a second fluid pressure responsive control means for selectively activating said first and said second path respectively, and fluid pressure supply means for supplying said first and second control means with fluid pressure to energize the same simultaneously with comparatively high and low fluid pressures respectively, said fluid pressure supply means comprising a fluid pressure source, a first conduit interconnecting said fluid pressure source and said first control means, a second conduit interconnecting said fluid pressure source and second control means, said conduits being adapted to accommodate the delivery of fluid pressure to each of said control means to energize the same simultaneously, a fluid pressure reducing means in one of said conduits for maintaining the pressure in one of said control means at a reduced value with respect to the pressure simultaneously energizing the other of said control means, and a valve means having portions in said one conduit for exhausting said reduced pressure from said one control means, said pressure reducing means including a fixed restriction in said one conduit at a location between said pressure source and the associated control means.

15. In a self-propelled vehicle having a powerplant, an engine fuel control means including a valve element operatively associated with said powerplant and adapted to control the rate at which fuel is applied thereto, a power output member, a first geared path adapted to be activated to drivably connect said powerplant and said output member to provide for the delivery of a driving torque to said output member tending to drive the latter in one direction, a second geared path adapted to be activated to drivably connect said powerplant and said driven member to provide for the delivery of a driving torque to said output member tending to drive the latter in the opposite direction, a first and a second fluid pressure responsive actuator means for selectively activating said first and said second path respectively, a fluid pressure source, a first conduit interconnecting said fluid pressure source and said first actuator means, a second conduit interconnecting said pressure source and second actuator means, said conduits being adapted to accommodate the delivery of fluid pressure to each of said actuator means simultaneously to energize the same, a fluid pressure reducing means in one of said conduits for maintaining the pressure energizing one of said actuator means at a reduced value with respect to the pressure simultaneously energizing the other of said actuator means, and a valve means having portions in said one conduit for exhausting said reduced pressure from said one actuator means, said valve means being adapted to be actuated by said fuel flow control means upon operation of the latter.

16. In a self-propelled vehicle having a powerplant, an engine fuel control means including a valve element operatively associated with said powerplant and adapted to control the rate at which fuel is applied thereto, a power output member, a first geared path adapted to be activated to drivably connect said powerplant and said output member to provide for the delivery of a driving torque to said output member tending to drive the latter in one direction, a second geared path adapted to be activated to drivably connect said powerplant and said driven member to provide for the delivery of a driving torque to said output member tending to drive the latter in the opposite direction, a first and a second fluid pressure responsive actuator means for selectively activating said first and said second path respectively, fluid pressure supply means for supplying said first and second control means with fluid pressure to energize the same simultaneously with comparatively high and low fluid pressures respectively, said fluid pressure supply means comprising a fluid pressure source, a first conduit interconnecting said fluid pressure source and said first actuator means, and a second conduit interconnecting said pressure source and second actuator means, said conduits being adapted to accommodate the delivery of fluid pressure to each of said actuator means to energize the same simultaneously, a fluid pressure reducing means in one of said conduits for maintaining the pressure energizing one of said actuator means at a reduced value with respect to the pressure simultaneously energizing the other of said actuator means, and a valve means having portions in said one conduit for exhausting said reduced pressure from said one actuator means and for blocking said second conduit, said valve means being adapted to be actuated by said fuel flow control means upon operation of the latter.

17. In a self-propelled vehicle having a powerplant, an engine fuel control means including a valve element operatively associated with said powerplant and adapted to control the rate at which fuel is applied thereto, a power output member, a first geared path adapted to be activated to drivably connect said powerplant and said output member to provide for the delivery of a driving torque to said output member tending to drive the latter in one direction, a second geared path adapted to be activated to drivably connect said powerplant and said driven member to provide for the delivery of a driving torque to said output member tending to drive the latter in the opposite direction, a first and a second fluid pressure responsive actuator means for selectively activating said first and said second path respectively, a fluid pressure source, a first conduit interconnecting said fluid pressure source and said first actuator means, a second conduit interconnecting said fluid pressure source and second actuator means, said conduits being adapted to accommodate the delivery of fluid pressure to each of said actuator means simultaneously to energize the same, means in one of said conduits for providing a reduced pressure in one of said actuator means with respect to the pressure simultaneously energizing the other of said actuator means, a valve means having portions in said one conduit for exhausting the reduced pressure from said one actuator means, said valve means being adapted to be actuated by said fuel flow control means upon operation of the latter, another fluid pressure source, a third conduit interconnecting said valve means and said other fluid pressure source, said valve means being operative independently of said fuel control means in response to an increase in fluid pressure at said other fluid pressure source, and means for regulating the magnitude of said reduced pressure to a value which is proportional to the magnitude of the torque being delivered through said one geared power flow path.

References Cited in the file of this patent

UNITED STATES PATENTS

| | | |
|---|---|---|
| 2,185,273 | Sanford | Jan. 2, 1940 |
| 2,221,393 | Carnegie | Nov. 12, 1940 |
| 2,373,122 | La Brie | Apr. 10, 1945 |
| 2,480,933 | Jandasek | Sept. 6, 1949 |
| 2,493,592 | Peabody | Jan. 3, 1950 |
| 2,499,280 | Redman | Feb. 28, 1950 |
| 2,523,726 | Seeger | Sept. 26, 1950 |
| 2,599,215 | Wemp | June 3, 1952 |
| 2,629,265 | Dodge | Feb. 24, 1953 |
| 2,633,034 | Mathers | Mar. 31, 1953 |
| 2,640,373 | Jandasek | June 2, 1953 |
| 2,641,144 | Schneider | June 9, 1953 |
| 2,645,135 | Frank | July 14, 1953 |
| 2,679,768 | Baule | June 1, 1954 |
| 2,682,787 | Holdeman | July 6, 1954 |
| 2,766,639 | Rosenberger | Oct. 16, 1956 |
| 2,815,684 | Roche | Dec. 10, 1957 |

UNITED STATES PATENT OFFICE
CERTIFICATE OF CORRECTION

Patent No. 2,953,940                September 27, 1960

Arthur John Slemmons

It is hereby certified that error appears in the printed specification of the above numbered patent requiring correction and that the said Letters Patent should read as corrected below.

Column 8, line 13, for "passed" read -- pressed --; column 9, line 8, for "66 s in" read -- 66 is in --, line 43, for "elemnet" read -- element --, line 45, after "valve" insert -- 59 --; column 16, line 32, after "power" insert -- flow --.

Signed and sealed this 11th day of April 1961.

(SEAL)
Attest:

ERNEST W. SWIDER

Attesting Officer

ARTHUR W. CROCKER
Acting Commissioner of Patents